US012504095B2

(12) United States Patent
Wang et al.

(10) Patent No.: US 12,504,095 B2
(45) Date of Patent: Dec. 23, 2025

(54) SNAP ACTION ASSEMBLY AND A NORMALLY OPEN VALVE USING THE SAME

(71) Applicant: Xiamen Koge Micro Tech Co., Ltd., Fujian (CN)

(72) Inventors: Sicheng Wang, Fujian (CN); Jihui Yan, Fujian (CN)

(73) Assignee: Xiamen Koge Micro Tech Co., Ltd., Fujian (CN)

( * ) Notice: Subject to any disclaimer, the term of this patent is extended or adjusted under 35 U.S.C. 154(b) by 90 days.

(21) Appl. No.: 18/735,336

(22) Filed: Jun. 6, 2024

(65) Prior Publication Data

US 2025/0198537 A1    Jun. 19, 2025

(30) Foreign Application Priority Data

Dec. 19, 2023    (CN) .......................... 202323474541.1

(51) Int. Cl.
*F16K 31/56* (2006.01)
*F16K 31/06* (2006.01)

(52) U.S. Cl.
CPC .......... *F16K 31/56* (2013.01); *F16K 31/0655* (2013.01)

(58) Field of Classification Search
CPC .... F16K 31/56; F16K 15/184; F16K 31/0655; F16K 31/06
See application file for complete search history.

(56) References Cited

U.S. PATENT DOCUMENTS

| | | | | |
|---|---|---|---|---|
| 3,765,644 A * | 10/1973 | Zeuner | ................ | F16K 31/0655 251/129.02 |
| 4,832,313 A * | 5/1989 | Hashimoto | ......... | F16K 31/0686 251/129.17 |
| 5,116,020 A * | 5/1992 | Peng | ...................... | F02M 69/08 251/332 |
| 6,068,237 A * | 5/2000 | Holmes | ................... | F16K 31/06 251/129.18 |
| 7,748,683 B1 * | 7/2010 | Kelly | .................. | F16K 31/0655 251/129.08 |
| 11,685,528 B2 * | 6/2023 | John | ................... | F16K 31/0624 137/625.65 |
| 2004/0079914 A1 * | 4/2004 | Burrola | ................. | F16K 39/022 251/129.15 |

FOREIGN PATENT DOCUMENTS

CN    219345602 U    7/2023

* cited by examiner

*Primary Examiner* — Umashankar Venkatesan
(74) *Attorney, Agent, or Firm* — Cooper Legal Group, LLC

(57) ABSTRACT

A resetting structure and a normally open one-way valve using the same is disclosed. The valve includes a valve plate arranged in a communication cavity of the normally open one-way valve, the valve plate includes a mounting portion at the center and a connecting portion around the mounting portion; the connecting portion is elastic, the periphery of the connecting portion is fixed to inner wall of the communication cavity, and the mounting portion can depend on elastic deformation of the connecting portion and the drive assembly on the one-way valve is moved in the communication cavity; one end of the mounting portion is connected to the connecting rod of the one-way valve, and the other end is used for opening and closing gas nozzle of the one-way valve; and the connecting portion is annular plate-like, and inner side wall of the connecting portion is fixed to the mounting portion.

8 Claims, 5 Drawing Sheets

SNAP ACTION ASSEMBLY AND A NORMALLY OPEN VALVE USING THE SAME

CROSS-REFERENCE TO RELATED APPLICATION

This application claims the priority and benefit of Chinese patent application serial no. 202323474541.1, filed on Dec. 19, 2023. The entirety of Chinese patent application serial no. 202323474541.1 is hereby incorporated by reference herein and made a part of this specification.

TECHNICAL FIELD

The present application relates to a technical field of one-way valve, and in particular, to a resetting structure and a normally open one-way valve using the same.

BACKGROUND ART

A one-way valve is an element of pneumatic control system, which can prevent compressed air from flowing reversely. A normally open one-way valve means that both an input end and an output end are in an open state, so as to reduce energy consumption.

In a related technology, a Chinese patent application no. CN219345602U discloses a normally open one-way valve, including a valve head and a valve body. A communication cavity is defined in the valve head, and the valve head is further provided with a through hole for air intake and an gas nozzle for air exhaust. The valve body is further provided with a drive assembly including a magnetic collector, an iron piece connected to the magnetic collector and a plastic connecting rod. The connecting rod and the iron piece are slidingly connected inside the valve body, and a valve plate is mounted in one end of the connecting rod in the communication cavity. The valve plate has elasticity and is fixed on the valve body by a folded edge, and a convex ring protruding in the direction away from the valve head is formed on the folded edge. When it is needed to separate the through hole for air intake from the gas nozzle for air exhaust, the magnetic collector is electrified to attract the iron piece, and then the iron piece drives the connecting rod to move and pushes the valve plate to move against the closed gas nozzle. When it is needed to re-communicate the through hole and the gas nozzle, the magnet connector is no longer powered, so that the opening of the gas nozzle can be opened under the restoring force of the valve plate, and the next operation can be performed.

However, in actual use, a convex structure of the valve plate facing the drive assembly is a form of main elastic structure, and the deformation area is small, which leads to insufficient storage of elastic force, so that it is difficult to restore the whole valve plate in time or easily restore it to its original position, thus affecting the normal use of the normally open one-way valve.

SUMMARY

In order to store larger elasticity for resetting structure of normally open one-way valve, so as to improve reset efficient, the present application provides a resetting structure and a normally open one-way valve using the same.

In a first aspect, the present application provides a resetting structure, adopting the following technical solution:

a resetting structure, including a valve plate arranged in a communication cavity of the normally open one-way valve, in which the valve plate includes a mounting portion at the center and a connecting portion around the mounting portion;

the connecting portion is elastic, the periphery of the connecting portion is fixed to inner wall of the communication cavity, and the mounting portion can be moved in the communication cavity by means of elastic deformation of the connecting portion and the drive assembly on the one-way valve;

one end of the mounting portion is connected to the connecting rod of the one-way valve, and the other end is used for opening and closing gas nozzle of the one-way valve; and the connecting portion is annular plate-like, and inner side wall of the connecting portion is fixed to the mounting portion.

By adopting the above technical solution, since the connecting portion is plate-like, the whole connecting portion is in a tensioned state. When the movement of the mounting portion is performed by the drive assembly, the entire connecting portion facing the valve head is elastically deformed to be inclined. In comparison with providing an elastic force by bending toward a direction away from the valve in the conventional technology, it has a higher elastic force. When the mounting portion needs to be reset, it can be quickly reset through the elastic force stored in the connecting portion, without affecting the normal use of the one-way valve. In addition, the resetting structure is arranged in the communication cavity, being capable of reducing space occupation.

In a second aspect, the present application provides a resetting structure, adopting the following technical solution:

a resetting structure, including a valve plate arranged in a communication cavity of the normally open one-way valve, wherein the valve plate includes a mounting portion at the center and a connecting portion around the mounting portion;

the connecting portion is elastic, the periphery of the connecting portion is fixed to inner wall of the communication cavity, the mounting portion can depend on elastic deformation of the connecting portion, and the drive assembly on the one-way valve is moved in the communication cavity;

one end of the mounting portion is connected to the connecting rod of the one-way valve, and the other end is used for opening and closing the gas nozzle of the one-way valve; and the connecting portion includes a protruding ring portion surrounding the mounting portion, which protrudes towards the valve head.

By adopting the following technical solution, since the connecting portion is provided with the protruding ring portion protruding towards the valve head, when the mounting portion is moved by the drive assembly, the protruding ring portion can be spread outwardly. The entire convex ring is subjected to elastic deformation, increasing stressed area. Compared to the related art where only a small part of position can provide elasticity by bending away from the valve head, the present application can provide greater restoring elasticity, so that when the mounting portion needs to be reset, it can be quickly reset through the elastic force stored in the connecting portion, thus facilitating the normal use of the one-way valve. In addition, the resetting structure is arranged in the communication cavity, being capable of reducing space occupation.

In a third aspect, the present application provides a resetting structure, adopting the following technical solution:

A resetting structure, including a valve plate arranged in a communication cavity of the normally open one-way valve, wherein the valve plate includes a mounting portion at the center and a connecting portion around the mounting portion;

the connecting portion is elastic, a periphery of which is fixed to the inner wall of the communication cavity, wherein the mounting portion can be deformed by the elasticity of the connecting portion, and the drive assembly on the one-way valve moves in the communication cavity;

one end of the mounting portion is connected to the connecting rod of the one-way valve, and the other end is used for opening and closing gas nozzle of the one-way valve; and the resetting structure further includes an additional elastic part, one end of which is arranged at one end of the mounting portion away from the connecting rod, and the other end of which is connected to the inner wall of the communication cavity.

By adopting the following technical solution, when the mounting portion is driven by the drive assembly to move, the connecting portion is bent under the action of elasticity, and the additional elastic part can further store elasticity. Compared to the related art where only a small part of position can provide elasticity by bending away from the valve head, the present application can provide a greater reset elasticity, therefore, when the mounting portion needs to be reset, it can be quickly reset through the elastic force stored in the connecting portion, facilitating the normal use of the one-way valve. In addition, the resetting structure is arranged in the communication cavity, being capable of reducing space occupation.

Optionally, the additional elastic part is a spring whose axial direction is parallel or coincident with the moving direction of the mounting portion;

The internal diameter of the additional elastic part is larger than that of the gas nozzle, and located at the periphery of the opening of the gas nozzle.

By adopting the following technical solution, the deformation of the spring can be stored and released elastically, and the spring is arranged in the periphery of the gas nozzle, so the use of the mounting portion is not easily influenced by the spring.

In a fourth aspect, the present application provides a normally open one-way valve, adopting the following technical solution:

a normally open one-way valve, including any one of the resetting structures mentioned above, and further including:

a valve body;

a valve head, one end of which is used for connecting with the valve body, and a communication cavity for receiving the resetting structure is formed between the valve head and the valve portion, and the valve head is provided with a through hole and an gas nozzle; and a drive assembly, in which the drive assembly includes a magnetic collector, an iron piece and a connecting rod connected to the iron piece, and the connecting rod is arranged in the valve body. One end of the connecting rod is located in the communication cavity and fixed to the mounting portion, and the magnetic collector can be electrified to drive the iron piece to move towards the valve head, thus sealing the mounting portion to the opening of the gas nozzle.

By adopting the following technical solution, after the magnetic collector is electrified, the iron piece can be attracted, so that the iron piece drives the connecting rod to move, so that the resetting structure can store the elastic force and close the opening of the gas nozzle. When the magnetic collector is out of power, the mounting portion, the connecting rod and the iron piece can be reset by the elastic reset force of the resetting structure, so as to facilitate for the next use. Since the resetting structure can store and release more elasticity, the one-way valve can restore the stored elasticity through the connecting portion, thus facilitating the normal use of the one-way valve. In addition, the resetting structure is arranged in the communicating cavity, being capable of reducing space occupation.

Optionally, the valve body includes a detachable back cover and a valve portion, one end of the valve portion away from the back cover is detachably connected to the valve head.

By adopting the following technical solution, an overall mounting and detaching efficiency of the one-way valve is improved, and replacing inner parts of the one-way valve is facilitated.

Optionally, one end of the valve head facing the valve body is provided with a positioning column, a passing hole for passing through the positioning column is defined in the end face of the valve portion close to the back cover, and the back cover is provided with a positioning sleeve for inserting the positioning column.

By adopting the above technical solution, the positioning column for passing through the passing hole is inserted into the positioning sleeve, so that the housing of the one-way valve form a whole body, which facilitates mounting and positioning.

Optionally, a first insertion groove is defined in the opposite outer side walls of the valve head, the first insertion groove is passed through two end faces of the valve head, and a locking groove for communicating with the first insertion groove is arranged in one end of the valve head away from the valve body;

The valve portion is fixed with a first insertion rod for inserting into the first insertion groove, the first insertion rod has elasticity, and a lock section for inserting into the locking groove is fixed to one end of the first insertion rod.

By adopting the above technical solution, the first insertion rod is inserted into the first insertion groove, while the lock section is inserted into the locking groove, thereby achieving the connection of the valve portion and the valve head. Since the first insertion rod has elasticity, the lock section is correspondingly inserted into the first insertion groove by bending the first insertion rod while connecting the valve portion with the valve head. The lock section is slidably inserted into the locking groove, the step for detaching is similarly performed, so that the mounting and detaching is more convenient.

Optionally, a second insertion groove is defined in two opposite outer side walls of the valve portion, which is passed through end face of the valve portion away from the valve head, and a rib portion is arranged in the second slot;

The back cover is provided with a second insertion rod for inserting into the second insertion groove, the second insertion rod has elasticity, and is defined with a fixing hole for a rib portion to insert in.

By adopting the above technical solution, the second insertion rod is inserted into the second insertion groove, the rib portion is inserted in the fixing hole, thereby achieving the connection the valve portion with the valve head. Since the second insertion rod has elasticity, the rib portion can be inserted in the fixing hole during the process of moving the second insertion rod to the second insertion groove while connecting the valve portion with the back cover, and thus achieving the fixture of the valve portion with the valve head. Dismounting can be performed similarly, so that the mounting and the dismounting are more convenient.

Optionally, an annular groove for the connecting portion to insert in is defined in one end face of the valve head close to the valve body, a positioning bulge edge is arranged in the annular groove, and a positioning groove for the positioning bulge edge to insert in is defined in one end face of the connecting portion.

By adopting the above technical solution, the connecting portion can be received in the annular groove, so as to fix the connecting portion when connecting the valve head with the valve portion, and the positioning bulge edge and the positioning groove are provided, so that the valve plate is difficult to move.

In summary, the present application including at least one of the following beneficial technical effects:
1. the connecting portion is provided as plate-like or the protruding ring portion is provided or the additional elastic part is provided, so that the resetting structure can have a larger reset elasticity and the valve plate can be reset quickly, which is difficult to affect the normal use of the one-way valve;
2. the resetting structure is arranged in the communication cavity, being capable of reducing space occupation; and
3. both of the first insertion rod and the second insertion rod are provided, so that the valve portion and the back cover, the valve portion and the valve head can be mounted and dismounted more conveniently.

DETAILED DESCRIPTION

The present application is further described in detail below in combination with FIGS. 1-5.

Embodiment 1

Figure 1:
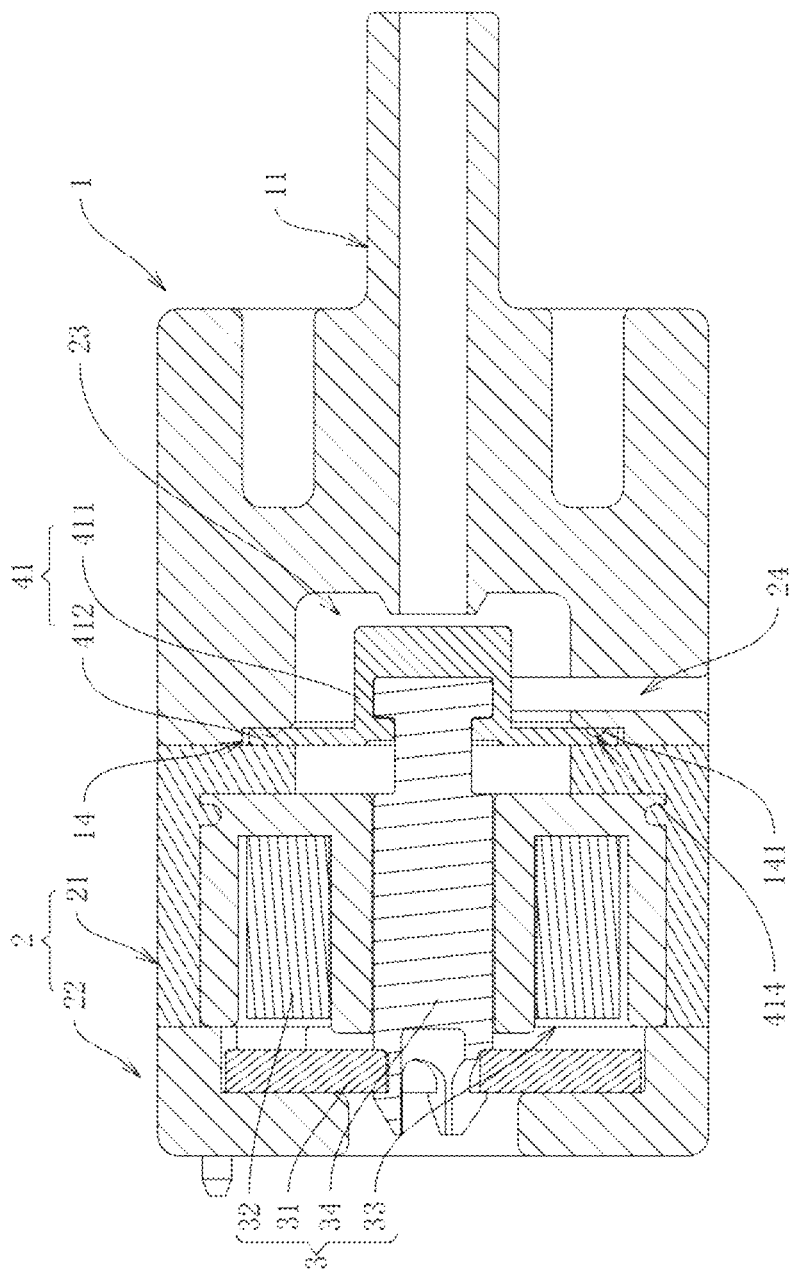
FIG. 1 is a schematic sectional structure diagram according to Embodiment 1 of the present application.
Figure 2:
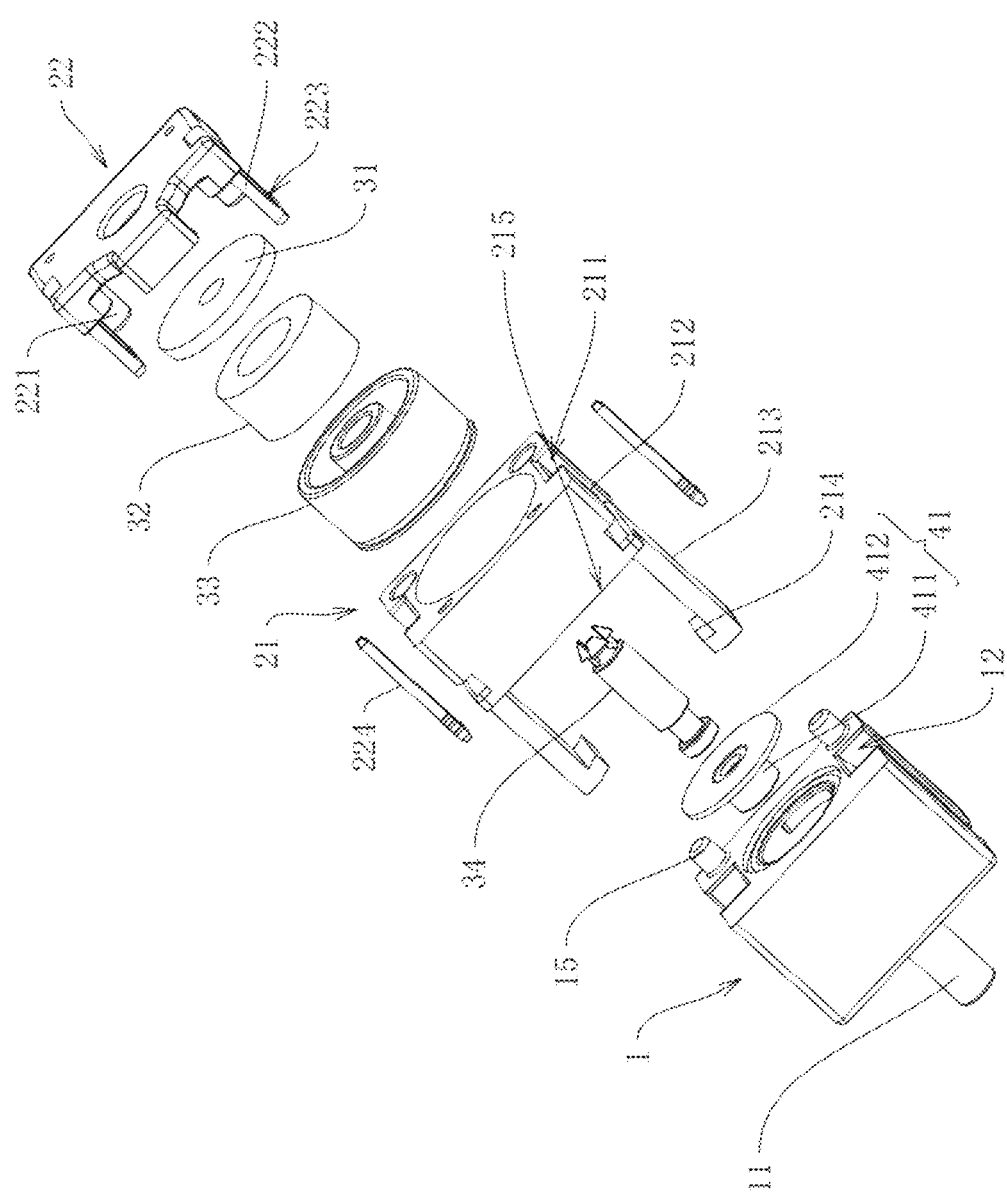
FIG. 2 is an exploded structure view according to Embodiment 1 of the present application.

The present application provides a normally one-way valve and a resetting structure arranged in the normally one-way valve. Referring to FIG. 1 and FIG. 2, the normally one-way valve includes a valve head 1 and a valve body 2, the valve head 1 is detachably connected to the valve body 2, and the valve body 2 includes a valve portion 21 connected to the valve head 1 and a back cover 22 detachably connected to the valve portion 21.

Specifically, one end face of the valve head 1 close to the valve portion 21 is fixed with two positioning columns 15. The valve portion 21 is box-shaped, and a passing hole 215 for the positioning column 15 to pass through is defined in its end face away from the valve head 1. The surface of the back cover 22 facing the valve portion 21 is fixed with two positioning sleeves 221. After passing through the passing hole 215, the positioning column 15 can be inserted into the positioning sleeve 221 in one-to-one correspondence, so that the valve head 1 is connected and positioned to the valve body 2, which makes it difficult for the valve portion 21, the valve head 1 and the back cover 22 to move in the direction perpendicular to the axis of the positioning column 15 relatively, thereby improving the overall stability of the normally open one-way valve. In other embodiments of the present application, the number of positioning columns 15 and positioning sleeves 221 can be other quantities.

Figure 3:
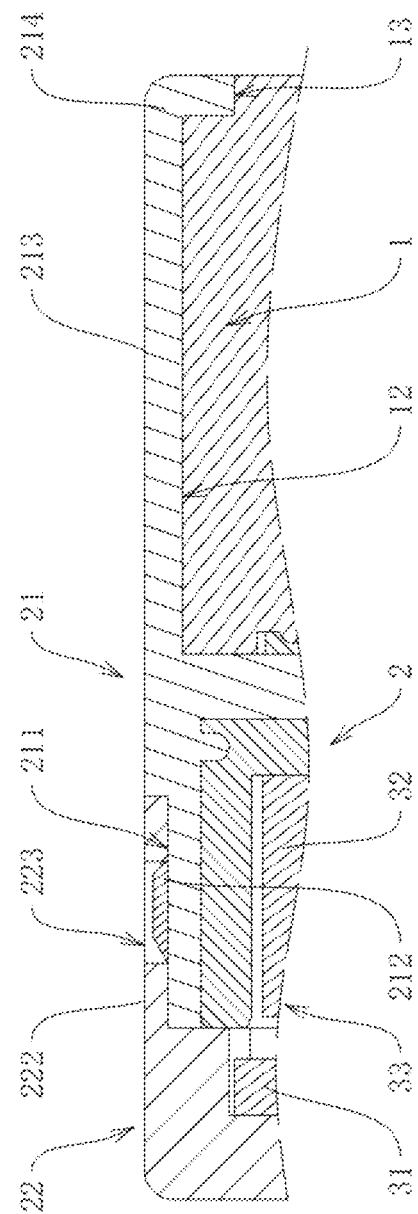
FIG. 3 is an schematic partial sectional structure diagram showing connections of the valve portion and the back cover, as well as the valve portion and the valve head according to Embodiment 1 of the present application.

Referring to FIG. 2 and FIG. 3, a first insertion groove 12 is defined in the opposite side walls of the valve head 1, and the two first insertion grooves 12 extend through the two end faces of the valve head 1. Two locking grooves 13 are defined in the end face of the valve head 1 away from the valve portion 21, and two locking grooves 13 are respectively in communication with one end of the first insertion groove 12.

One end face of the valve portion 21 close to the valve head 1 is fixed with two first insertion rods 213. When the valve portion 21 and the valve head 1 are fixed, the first insertion rod 213 can be inserted into the first insertion groove 12. A locking part 214 is fixed at the end of the first insertion rod 213 configured to be inserted in the locking groove 13, so as to realize the fixing of the valve portion 21 and the valve head 1. The first insertion rod 213 is elastic, therefore, the first insertion rod 213 can be bent during mounting and the locking part 214 can slide in the first insertion groove 12 until the locking part 214 is inserted in the locking groove 13, facilitating the mounting of the valve portion 21 and the valve head 1, as well as the dismounting of the valve portion 21 and the valve head 1.

Referring to FIG. 2 and FIG. 3, a second insertion groove 211 is defined in the opposite outer side walls of the valve portion 21, which extends through the surface of the valve portion 21 away from the valve head 1, and a rib portion 212 is fixed in the second insertion groove 211. The back cover 22 is fixed with two second insertion rods 222. When fixing the valve portion 21 and the back cover 22, the second insertion rod 222 can be inserted in the second insertion groove 211. A fixing hole 223 for inserting the rib portion 212 is defined in the side wall of the second insertion rod 222, so that the valve portion 21 and the valve head 1 are fixedly connected. The second insertion rod 222 is elastic, therefore, it can be slid in the second insertion groove 211 during mounting until the rib portion 212 is inserted in the fixing hole 223, facilitating the mounting of the valve portion 21 and the back cover 22, as well the dismounting of the valve portion 21 and the back cover 22. Accordingly, in order to facilitate mounting, the side wall of the rib portion 212 close to the back cover 22 is arranged as an inclined guide surface.

Referring to FIG. 1 and FIG. 2, the side of the valve portion 21 facing the valve head 1 is defined with a groove, and the valve portion 21 and the valve head 1 are connected to form a communication cavity 23. The valve head 1 includes a gas nozzle 11 for ventilation, which is in communication with the communication cavity 23. A through hole 24 in communication with the communication cavity 23 is defined in the valve head 1, so that the conduction function of the one-way valve can be realized by the through hole 24 and the gas nozzle 11.

Referring to FIG. 1 and FIG. 2, the resetting structure includes a resetting assembly 4, the resetting assembly 4 includes a valve plate 41 fixed to the inner wall of the communication cavity 23, and the valve plate 41 includes a mounting portion 411 located in the center and a connecting portion 412 surrounding the mounting portion 411. An annular groove 14 for the connecting portion 412 to insert in is defined in one end face of the valve head 1, and a positioning bulge edge 141 is fixed on the inner wall of the annular groove 14. A positioning groove 414 for the positioning bulge edge 141 to insert in is arranged in the connecting portion 412, so that the connecting portion 412 of the valve plate 41 is fixed on the valve body 2 when the valve portion 21 and the valve head 1 are locked.

The connecting portion 412 is annular plate-like and elastic, one end of which is fixed to the mounting portion 411. The valve body 2 is provided with a drive assembly 3, and the drive assembly 3 drives the connecting portion 412 to move towards the opening direction of the gas nozzle 11 to close the opening of the gas nozzle 11. The drive assembly 3 includes a magnetic collector 33 snap connected with the valve portion 21. The magnetic collector 33 includes an annular coil 32 arranged therein and two PIN connectors 224 electronically connected with the coil 32 and extended through the valve portion 21 to go beyond the valve portion 21. The coil 32 can be energized via the PIN connectors 224 to generate a magnetic field at one side of the magnetic collector 33. The drive assembly 3 further includes a connecting rod 34 mounted on the magnetic collector 33, one end of the connecting rod 34 is located in the communication cavity 23 and fixed to the mounting portion 411, one end of which far away from the mounting portion 411 is coaxially snap connected with an annular iron piece 31. When the coil is powered on, the magnetic collector 33 can attract the iron piece 31, and the movement of the iron piece 31 drives the connecting rod 34 to move, and the movement of the connecting rod 34 drives the mounting portion 411 to move, thus sealing the opening of the gas nozzle 11, so that the connecting portion 412 is elastically deformed to store elastic potential energy. When the magnetic collector 33 is powered off, the connecting rod 34 and the iron piece 31 can be quickly reset under the action of the restoring elastic force of the connecting portion 412, and the affect on the operation of the one-way valve is reduced. Since the connecting portion 412 is plate-like, the whole connecting portion 412 can be kept in a tensioned state. When the mounting portion 411 is driven to move by the drive assembly 3, the entire connecting portion 412 is elastically deformed to an inclined state in the direction of the valve head 1. Compared with elasticity produced by bending in the direction away from the valve head 1 in the related art, it has higher elasticity.

The implementation principle of embodiment in the present application is as follows. In regular use, the through hole 24 and the gas nozzle 11 simultaneously communicate with the communication cavity 23. When the gas nozzle 11 needs to be closed, the magnetic collector 33 can be energized to elastically deform the connecting portion 412 of the valve plate 41, and the mounting portion 411 of the valve plate 41 can seal the opening of the gas nozzle 11. When it is necessary to open the opening of the gas nozzle 11, it is only necessary to close it. At this time, the iron piece 31 is no longer attracted by magnetism. The mounting portion 411 can be quickly detached from the opening of the gas nozzle 11 to perform a next operation by the restoring elastic force of the connecting portion 412.

Embodiment 2

The embodiment 2 in the present application differs from embodiment 1 in that the resetting structure is different.

Figure 4:
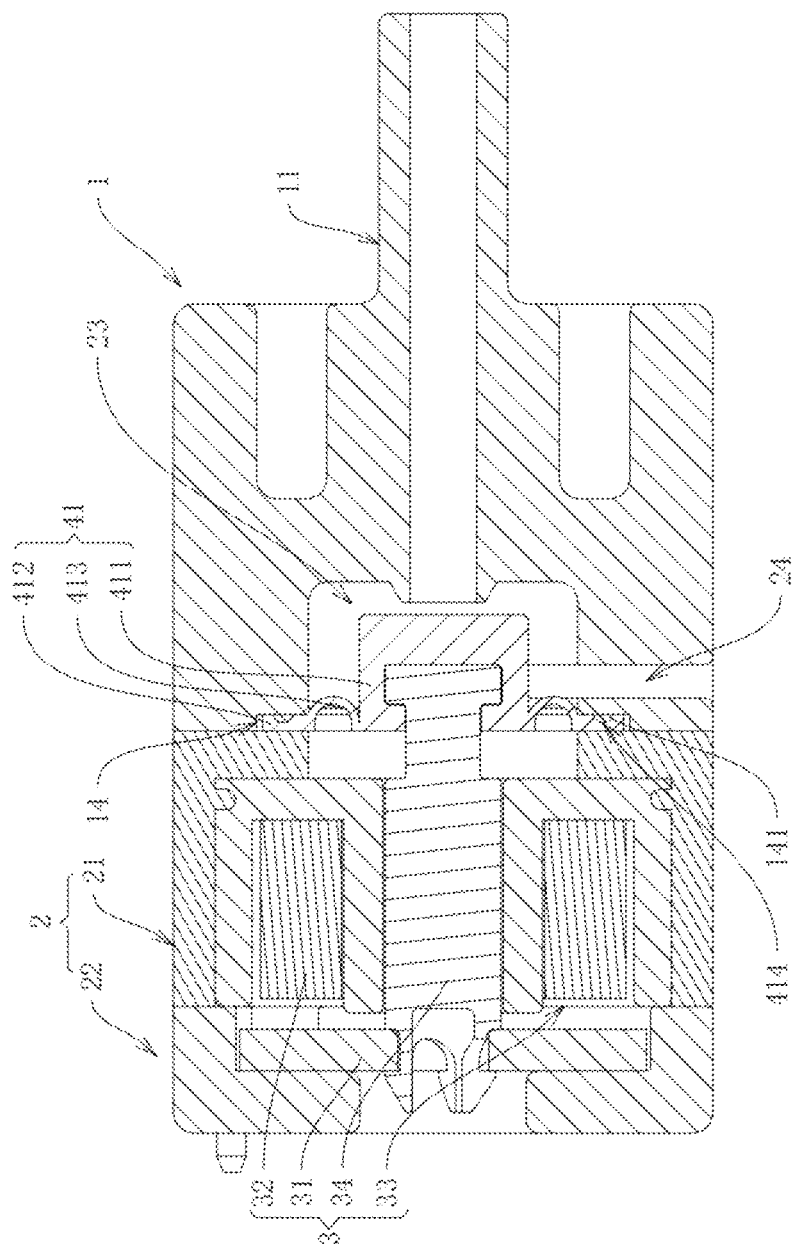
FIG. 4 is a schematic sectional structure diagram according to Embodiment 2 of the present application.

Referring to FIG. 4, the connecting portion 412 of the valve plate 41 includes a protruding ring portion 413 protruding towards the direction of the valve head 1, and a 12 wall thickness of the protruding ring portion 413 is less than or equal to that of other parts of the connecting portion 412. Since the protruding ring portion 413 protrudes towards the direction of the valve head 1, when the mounting portion 411 is driven by the drive assembly 3 to move, it can cause the protruding ring portion 413 to generate an outward spreading force, so that the whole protruding ring portion 413 is subjected to elastic deformation, increasing stressed area. Compared to the related art where only a small part of position can provide elasticity by bending away from the valve head, the present application can provide greater restoring elasticity, so that it can be quickly reset through the elastic force stored in the connecting portion when the mounting portion needs to be reset, facilitating the normal use of the one-way valve. In addition, the resetting structure is arranged in the communication cavity, resulting in reduced space occupation.

Embodiment 3

The embodiment 3 in the present application differs from Embodiment 2 in that the resetting structure is different.

Figure 5:
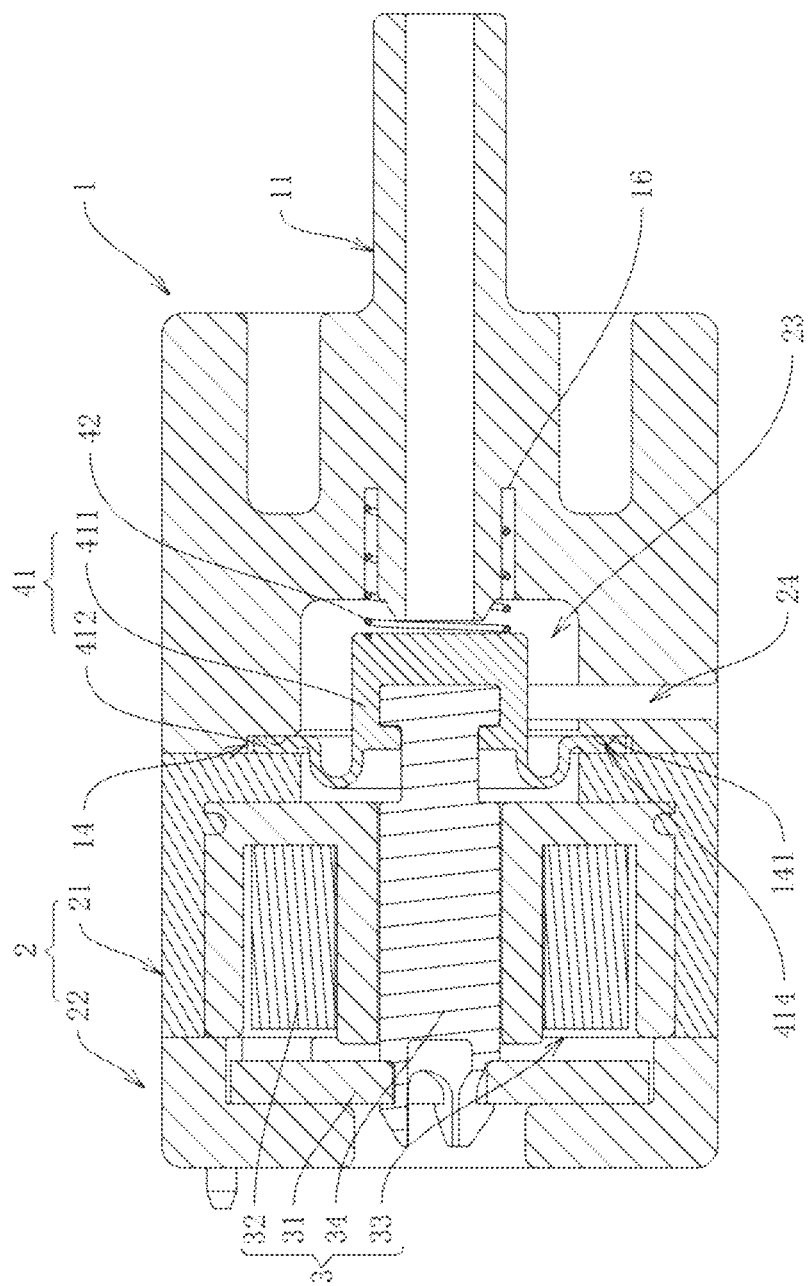
FIG. 5 is a schematic sectional structure diagram according to Embodiment 3 of the present application.

Referring to FIG. 5, the resetting structure further includes an additional elastic part. In the present application, the additional elastic part is spring 42 and sleeved around the opening of the gas nozzle 11, that is, internal diameter of the additional elastic part is larger than that of opening of the gas nozzle 11, thereby being capable of reducing the affect on the sealed gas nozzle 11 of the mounting portion 411. Correspondingly, a mounting groove 16 for one end of the spring 42 to insert in and fixed is arranged in the communication cavity 23 around the opening of the gas nozzle 11, and one end of the spring 42 away from the mounting groove 16 is fixed to the mounting portion 411. The additional elastic part can be also other elastic structures in other embodiments of the present application, for example a plurality of elastic pieces arranged around the opening of the gas nozzle 11, as long as it can provide additional elasticity for the mounting portion 411, without affecting the operation of the mounting portion 411.

When the mounting portion 411 is driven to move by the drive assembly 3, the additional elastic part can store elasticity when the connecting portion 412 is elastically bent. Compared with the related art where only a small part of position can be bent away from the valve head 1 to provide elasticity, the present application can provide a greater reset elasticity, so that it can be quickly reset through the elastic force stored in the connecting portion 412, facilitating the normal use of the one-way valve. In addition, the resetting assembly 4 is arranged in the communication cavity 23, being capable of reducing space occupation.

The above are the preferred embodiments of the present application, which are not intended to limit the protection scope of the present application. Therefore, all equivalent changes made according to the structure, shape and principle of the present application should be covered within the protection scope of the present application.

LISTING OF REFERENCE SIGNS

1. Valve head;
11. Gas nozzle;
12. First insertion groove;
13. Locking groove;
14. Annular groove;
141. Positioning bulge edge;
15. Positioning column;
16. Mounting groove;
2. Valve body;
21. Valve portion;
211. Second insertion groove;
212. Rib portion;
213. First insertion rod;
214. Lock section;
215. Passing hole;
22. Back cover;
221. Positioning sleeve;
222. Second insertion rod;
223. Fixing hole;
224. PIN connector;
23. Communication cavity;
24. Through hole;
3. Drive assembly;
31. Iron piece;
32. Coil;
33. Magnetic collector;
34. Connecting rod;
4. Resetting structure;
41. Valve plate;
411. Mounting portion;
412. connecting portion;
413. Protruding ring portion;
414. positioning groove;
42. Spring.

What is claimed is:

1. A resetting structure, comprising a valve plate provided in a communication cavity of a normally open one-way valve, wherein the valve plate comprises a mounting portion at a center and a connecting portion surrounding the mounting portion;

the connecting portion is elastic, a periphery of the connecting portion is fixed to an inner wall of the communication cavity, and the mounting portion is configured to move in the communication cavity by means of elastic deformation of the connecting portion and a drive assembly provided on the normally open one-way valve;

a first end of the mounting portion is connected to a connecting rod of the normally open one-way valve, and a second end of the mounting portion is used for opening and closing a gas nozzle of the normally open one-way valve;

the connecting portion is annular plate-like, and an inner side wall of the connecting portion is fixed to the mounting portion;

the connecting portion comprises a protruding ring portion surrounding the mounting portion, and the protruding ring portion protrudes towards a valve head; and the resetting structure further comprises an additional elastic part, a first end of the additional elastic part is arranged at one end of the mounting portion away from the connecting rod, and a second end of the additional elastic part is connected to an inner wall of the communication cavity.

2. The resetting structure according to claim 1, wherein the additional elastic part is a spring, and an axial direction of the additional elastic part is parallel to or coincident with a moving direction of the mounting portion; and an inner diameter of the additional elastic part is larger than an inner diameter of the gas nozzle, and the additional elastic part is located around an opening of the gas nozzle.

3. A normally open one-way valve, comprising the resetting structure according to claim 1, and further comprising:

a valve body;

a valve head, wherein one end of the valve head is connected with the valve body, and the communication cavity for receiving the resetting structure is formed between the valve head and the valve body, and the valve head is provided with a through hole and the gas nozzle; and a drive assembly, the drive assembly comprises a magnetic collector, an iron piece and the connecting rod connected to the iron piece, the connecting rod is arranged in the valve body, one end of the connecting rod is positioned in the communication cavity and fixed to the mounting portion, and the magnetic collector is configured to be energized to drive the iron piece to move towards the valve head, so that the mounting portion closes the opening of the gas nozzle.

4. The normally open one-way valve according to claim 3, wherein the valve body comprises a detachable back cover and a valve portion, and one end of the valve portion away from the detachable back cover is detachably connected to the valve head.

5. The normally open one-way valve according to claim 4, wherein the one end of the valve head facing the valve body is provided with a positioning column, a passing hole for passing through the positioning column is defined in an end face of the valve portion close to the detachable back cover, and the detachable back cover is provided with a positioning sleeve for inserting the positioning column.

6. The normally open one-way valve according to claim 4, wherein a first insertion groove is defined in opposite outer side walls of the valve head, and extends through two end faces of the valve head, and a locking groove in communication with the first insertion groove is arranged in a second end of the valve head away from the valve body; and the valve portion is fixed with a first insertion rod for inserting into the first insertion groove, the first insertion rod has elasticity, and a locking part for inserting into the locking groove is fixed to one end of the first insertion rod.

7. The normally open one-way valve according to claim 4, wherein a second insertion groove is defined in opposite outer side walls of the valve portion, and extends through an end face of the valve portion away from the valve head, and a rib portion is arranged in the second insertion groove; and the detachable back cover is provided with a second insertion rod for inserting into the second insertion groove, the second insertion rod is elastic, and is defined with a fixing hole for the rib portion to insert in.

8. The normally open one-way valve according to claim 3, wherein an annular groove for the connecting portion to insert in is defined in one end face of the valve head close to the valve body, a positioning bulge edge is provided in the annular groove, and a positioning groove for the positioning bulge edge to insert in is defined in one end face of the connecting portion.

* * * * *